(12) United States Patent
Enomoto et al.

(10) Patent No.: US 6,226,124 B1
(45) Date of Patent: May 1, 2001

(54) TREMBLE CORRECTION DEVICE

(75) Inventors: Shigeo Enomoto, Tokyo; Shinji Tsukamoto, Saitama, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/407,988

(22) Filed: Sep. 29, 1999

(30) Foreign Application Priority Data

Sep. 30, 1998 (JP) .................................................. 10-277056

(51) Int. Cl.[7] .................................................. G02B 27/64
(52) U.S. Cl. .......................... 359/557; 359/554; 359/555; 359/556; 359/837; 359/694
(58) Field of Search .................................. 359/557, 554, 359/555, 556, 837, 694

(56) References Cited

U.S. PATENT DOCUMENTS

| 5,280,387 | 1/1994 | Maruyama | 359/554 |
| 5,387,999 | 2/1995 | Hayashi | 359/557 |
| 5,461,513 | 10/1995 | Maruyama | 359/837 |
| 5,754,339 | 5/1998 | Kanai et al. | 359/557 |
| 6,064,532 * | 5/2000 | Enomoto | 359/694 |

FOREIGN PATENT DOCUMENTS

| 825708 | 2/1998 | (EP) . |
| 2-81009 | 3/1990 | (JP) . |
| 2-284113 | 11/1990 | (JP) . |
| 3-237438 | 10/1991 | (JP) . |
| 6-43365 | 2/1994 | (JP) . |
| 7-248522 | 9/1995 | (JP) . |
| 7-311368 | 11/1995 | (JP) . |
| 10-66392 | 3/1998 | (JP) . |
| 11-23329 | 1/1999 | (JP) . |

OTHER PUBLICATIONS

Copal Electronics General Catalog, '96–97.

* cited by examiner

Primary Examiner—Mohammad Y. Sikder
(74) Attorney, Agent, or Firm—Greenblum & Bernstein, P.L.C.

(57) ABSTRACT

An angular positional data of binoculars in a lateral irection is calculated by integrating output of a gyro sensor. A positional data of correction lenses in the lateral direction is calculated by multiplying a driving step number of a rotor of a stepping motor which drives the correction lenses in the lateral direction, by a driving amount of the lens holding frame, which holds the correction lens, according to a one step rotation of the stepping motor. A difference between the angular positional data and the positional data of the correction lenses is calculated. If the difference is within a range from a positive threshold value to a negative threshold value, an electric power supply to a driving circuit of the stepping motor is stopped. With respect to a lengthwise direction, a similar operation to that of the lateral direction is performed.

11 Claims, 14 Drawing Sheets

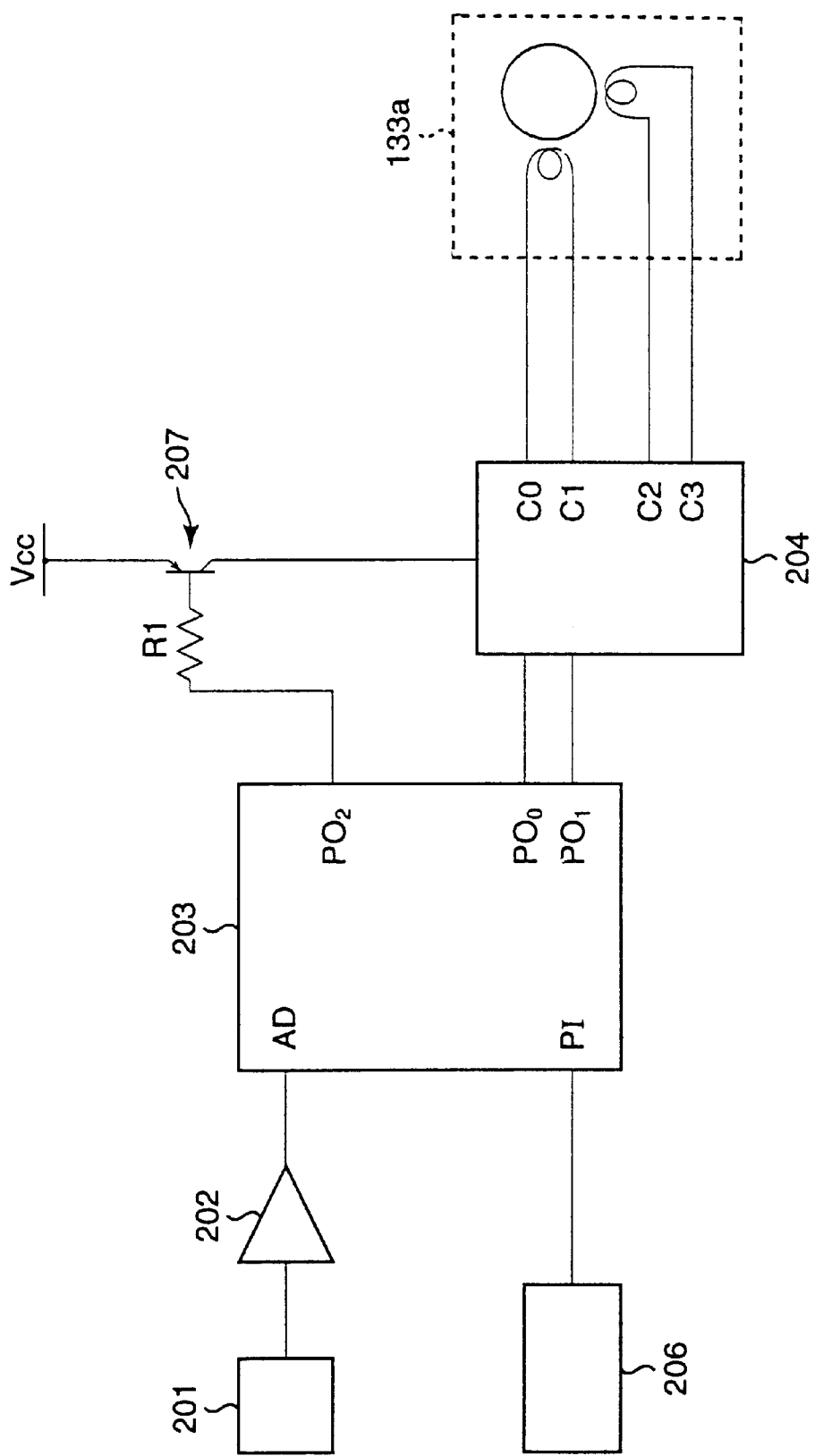

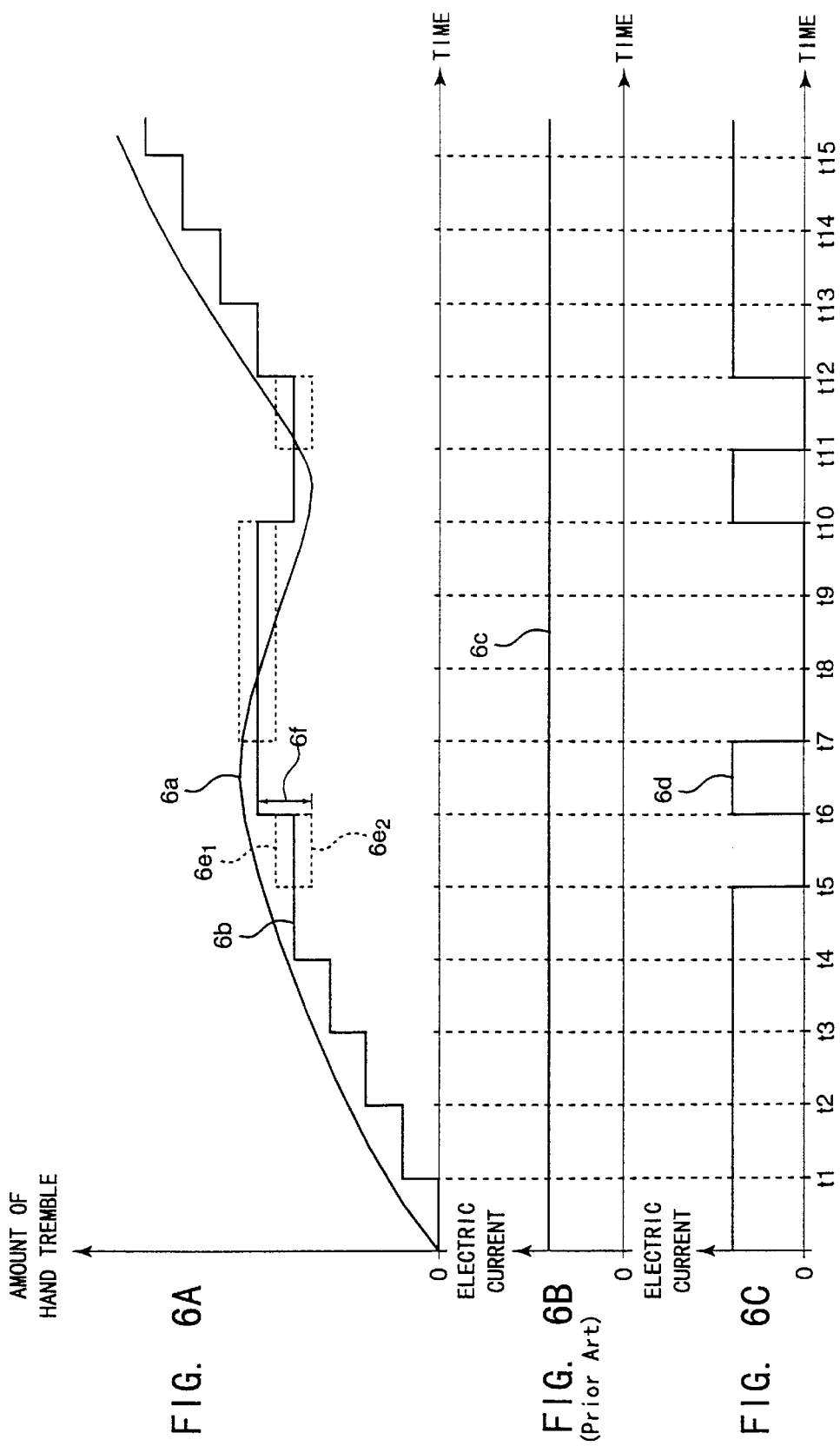

TREMBLE CORRECTION DEVICE

BACKGROUND OF THE INVENTION

1. Field of the Invention

The present invention relates to a tremble correcting apparatus which corrects a tremble, caused by a hand tremble and so on, of a focused image of an optical device.

2. Description of the Related Art

Conventionally, an optical device, such as a pair of binoculars, is provided with a tremble correcting apparatus, which corrects a tremble of a focused image caused by a hand tremble and so on. The tremble correcting apparatus comprises a correcting optical system. The correcting optical system is moved in a direction and by a predetermined amount such that a movement of the optical device is canceled, so that the tremble of the focused image is corrected.

As a driving apparatus which drives the correcting optical system, a ste ping motor,for example,isutilized. The stepping motor comprises a rotor, a stator and a coil. The stator is disposed around the rotor. The coil is wound around the stator. When an electric current flows through the coil, the stator is excited, so that the rotor rotates due to attractive and repulsive magnetic forces generated between the excited stator and the rotor. Accordingly, a rotating amount and a rotational direction of the rotor are determined by controlling the electric current which flows through the coil.

A transmitting mechanism changes a rotational movement of the rotor to a linear movement on a plane perpendicular to an optical axis of the correction optical system, before transmitting the rotational movement to the correction optical system. A driving amount of the correction optical system corresponding to one step rotation of the stepping motor, is detemined by an angular degree of the one step rotation of the stepping motor and a construction of the transmitting mechanism. Accordingly, the driving amount of the correction optical system is determined by controlling a step number of the rotation of the stepping motor. Further, a positional data of the correction optical system is detected based on an accumulation of the step number.

When the tremble of the optical device is not detected and it is not necessary to drive the correction optical system, the rotor should be fixed at a current rotational position. The excited state of the stator should be maintained in order to enable the rotor to be fixed at the current rotational position, and thus the electric current is continually passed through the coil. Namely, if the stepping motor is utilized as the driving mechanism of the correction optical system, it is necessary to continually keep the electric current turned on even if the correction optical system is not driven. Accordingly, the utilization of the stepping motor causes a large electric power consumption, and it is therefore uneconomical.

SUMMARY OF THE INVENTION

Therefore, an object of the present invention is to provide a tremble correcting device by which the electric power consumption is reduced.

In accordance with an aspect of the present invention, there is provided a tremble correcting device comprising: a detector that detects a trembling amount of an optical device; a correcting optical system that corrects a tremble of a focused image due to the optical device tremble; and a driving system that includes a stepping motor and a transmitting mechanism, disposed between the stepping motor and the correcting optical system, that converts a rotational movement of the stepping motor to a movement of the correcting optical system; and a controlling system that controls the driving system. The driving system drives the correcting optical system by a predetermined amount per one step. The controlling system controls the driving system such that, when a difference between the trembling amount detected by the detector and a position data of the correcting optical system, calculated based on a one step driving amount of the driving system, reaches a predetermined threshold, the driving device is driven to cancel the difference by controlling a driving electric current flowing in a coil of the stepping motor. When the difference is less than the predetermined threshold, the coil is electrically de-energized by the controlling system.

When the difference reaches the predetermined threshold, the coil is electrically energized by the controlling system such that a rotor of the stepping motor rotates by a predetermined angular amount unit.

When the coil is electrically de-energized and an external force applied to the optical device is transmitted by the stepping motor through the transmitting system, the external force is partially dissipated by the transmitting system so as to be less than a detent torque of the rotor of the stepping motor.

The tremble correcting device further comprises: a driving circuit that controls the driving electric current; and a switch that switches an electrical power supply to the driving circuit. The controlling system controls the switch, so that the electrical power supply is one of started and stopped.

When the difference reaches the predetermined threshold and the electric power supply is stopped, the controlling system starts the electric power supply such that the driving electric current flows in the coil in a direction similar to a direction of flow before the stopping of the electric power supply; and when the difference reaches the predetermined threshold and when the electric power is supplied, the controlling system controls a direction of flow of the driving electric current in the coil such that the difference is canceled by driving the stepping motor.

When the difference reaches the predetermined threshold and the electric power supply is stopped, the controlling system controls a direction of flow of the driving electric current in the coil such that the difference is canceled by driving the stepping motor, after starting the electric power supply.

The optical device is a pair of binoculars that includes a pair of telephoto optical systems. The transmitting mechanism is a screw feeder mechanism.

In accordance with another aspect of the present invention, there is provided a tremble correcting device comprising: a detector that detects an amount of an optical device tremble; a correcting optical system that corrects a tremble of a focused image due to the optical device tremble; and a driving system that includes a stepping motor and a transmitting mechanism in which a driving amount of an object driven by the stepping motor is relatively small in comparison with a rotational amount of the stepping motor, and deceleration of which is large; and a controlling system that controls the driving system. The transmitting mechanism is disposed between the stepping motor and the correcting optical system. The controlling system controls the driving system such that, when a difference between the trembling amount detected by the detector and a position data of the correcting optical system, calculated based on a one step driving amount of the driving system, reaches a predetermined threshold value, the driving device is driven to cancel the difference by controlling a flow of driving electric current in a coil of the stepping motor. When the difference is less than the predetermined threshold value, the coil is electrically de-energized by the controlling system.

The predetermined deceleration is pre-set such that an external torque, generated by an external force applied to the optical device being transmitted to the stepping motor through the correcting optical system, is less than a detent torque of the stepping motor at rest.

The optical device is a pair of binoculars that includes a pair of telephoto optical systems. The transmitting mechanism is a screw feeder mechanism.

BRIEF DESCRIPTION OF THE DRAWINGS

FIG. 4 is a block diagram indicating a correction optical system driving circuit;

FIG. 6A is a graph indicating a curve of a hand tremble and a movement of a correcting optical system, of the first embodiment;

FIG. 6B is a graph indicating a driving electric current of a stepping motor of the apparatus, due to a prior art;

FIG. 6C is a graph indicating a driving electric current of the stepping motor, due to the first embodiment;

DESCRIPTION OF THE PREFERRED EMBODIMENTS

Figure 1:
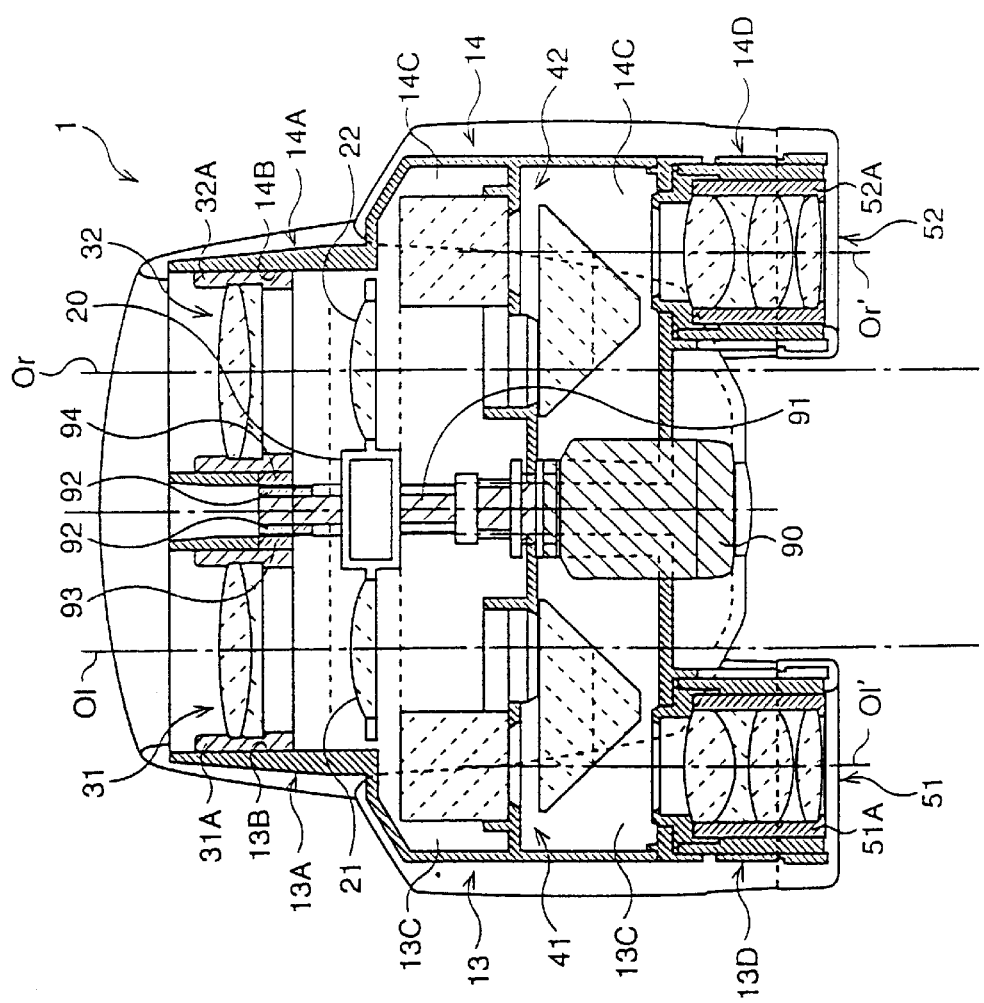
FIG. 1 is a sectional plan view of binoculars, to which embodiments according to the present invention are applied.

The present invention will now be described with reference to embodiments shown in the drawings.

FIG. 1 is a sectional view of binoculars 1, to which a first embodiment according to the present invention is applied.

Note that, in the embodiments "electrically energized" and "electrically de-energized" indicate that an electric power supply has either been turned ON or OFF, respectively.

A luminance flux passes a pair of objective lenses 31 and 32, and is directed to a pair of optical inversion systems 41 and 42, through a pair of correction lenses 21 and 22. Each of the optical inversion systems 41, 42 is a Porro prism, comprising two right-angle prisms, which inverts an image thereby producing an erected image. The luminance flux is directed to a pair of eyepieces 51 and 52, after passing through the pair of optical inversion systems 41, 42. Namely, a left telephoto optical system (a first telephoto optical system) comprises the correction lens 21, the objective lens 31, the optical inversion system 41, and the eyepiece 51; and a right telephoto optical system (a second telephoto optical system) comprises the correction lens 22, the objective lens 32, the optical inversion system 42, and the eyepiece 52. Ol is the optical axis of the objective lens 31, Or is the optical axis of the objective lens 32, Ol' is the optical axis of the eyepiece 51, and Or' is the optical axis of the eyepiece 52.

The objective lens 31 is held by an objective lens barrel 31A, and the objective lens 32 is held by an objective lens barrel 32A. The objective lens barrel 31A is supported by an inner surface of a hole 13B provided on an objective lens barrel supporting portion 13A of a left case 13, in such a manner that the objective lens barrel 31A can be moved along the optical axis Ol. Similarly, the objective lens barrel 32A is supported by an inner surface of a hole 14B provided on an objective lens barrel supporting portion 14A of a right case 14, in such a manner that the objective lens barrel 32A can be moved along the optical axis Or.

The eyepiece 51 is held by an eyepiece barrel 51A, and the eyepiece 52 is held by an eyepiece barrel 52A. The eyepiece barrel 51A is securely mounted in an eyepiece barrel supporting portion 13D of the left case 13, and the eyepiece barrel 52A is securely mounted in an eyepiece barrel supporting portion 14D of the right case 14. The Porro prism of the optical inversion system 41, is placed in a prism chamber 13C provided between the objective lens barrel supporting portion 13A and the eyepiece barrel supporting portion 13D, in the left case 13. Similarly, the Porro prism of the optical inversion system 42, is placed in a prism room 14C provided between the objective lens barrel supporting portion 14A and the eyepiece barrel supporting portion 14D, in the right case 14.

One engaging member (not shown), which faces the prism chamber 14C, is provided on the outer surface of the prism chamber 13C, and another engaging member (not shown), which faces the prism chamber 13C, is provided on the outer surface of the prism room 14C, whereby the prism room 13C and the prism room 14C are engaged with each other.

A rotation ring 90 is provided between the eyepiece barrel 51A and the eyepiece barrel 52A. A rotation ring axle 91 is fixed to the rotation ring 90, along the central axis of the rotation ring 90. A lift axle 92 is threadingly engaged with the rotation ring axle 91. The lift axle 92 is connected to the objective lens barrel 31A by a left arm 93, and is connected to the objective lens barrel 32A by a right arm 94.

When the rotation ring 90 is rotated, rotational movement is transmitted to the lift axle 92 via the rotation ring axle 91, so that the lift axle 92 moves along the optical axes Ol and Or. Namely, the rotational movement of the rotation ring 90 is converted to the longitudinal movement of the lift axle 92, in the direction of the optical axes Ol and Or. In the left telephoto optical system, the movement of the lift axle 92 is transmitted to the objective lens barrel 31A by the left arm 93. Similarly, in the right telephoto optical system, the movement of the lift axle 92 is transmitted to the objective lens barrel 32A by the right arm 94. Accordingly, the objective lens barrels 31A and 32A are moved uniformly and simultaneously, in accordance with the movement of the lift axle 92, in the direction of the optical axes Ol and Or.

Namely, the rotation ring 90, the rotation ring axle 91, the lift axle 92, the left and right arms 93 and 94, and the objective lens barrels 31A and 32A, constitute an integrated focusing unit. The synchronized movement of the objective lens barrels 31A and 32A, along the respective optical axes Ol and Or, is initiated by rotating the rotation ring 90. Accordingly, a focusing operation can be performed by rotating the rotation ring 90 clockwise or counterclockwise by a predetermined amount.

Further, the left case 13 is rotatable around the optical axis Ol of the objective lens 31 and the right case 14 is rotatable around the optical axis Or of the objective lens 32, in accordance with the alternation of engaging position of the engaging members, with respect to each of the prism chamber 13C and 14C of the left case 13 and the right case 14. The rotation of the left case 13 and the right case 14 is synchronized and independent of the integrated focusing unit. The left case 13 and the right case 14 are engaged with the facing engaging members located on the outer surfaces of the prism chambers 13C and 14C. Accordingly, when the left case 13 is rotated clockwise around the optical axis Ol, the right case 14 rotates counterclockwise around the optical axis Or, and when the left case 13 is rotated counterclockwise around the optical axis Ol, the right case 14 rotates clockwise around the optical axis Or, so that the interpupillary distance is adjusted.

Note that, in this specification, a "lateral direction" means a direction parallel to a standard plane on which the optical axes Ol and Or lie, being perpendicular to the optical axes Ol and Or, and a "lengthwise direction" means a direction perpendicular to the standard plane. Namely, while the binoculars 1 are held in a standard position, the lateral direction corresponds to a horizontal direction and the lengthwise-direction corresponds to a vertical direction.

Figure 2:
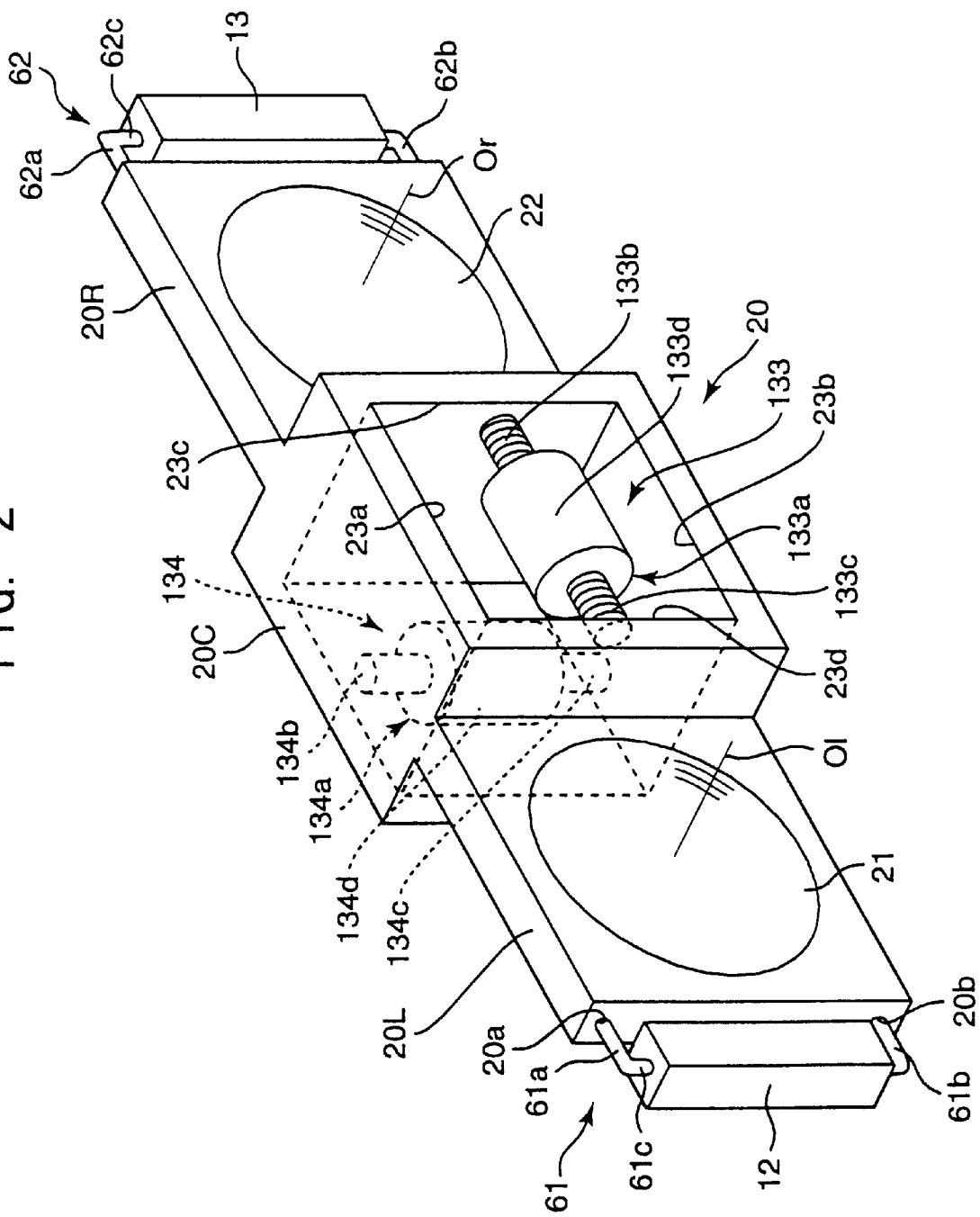
FIG. 2 is a perspective view of an apparatus for correcting a trembling of a focused image, to which embodiments according to the present invention are applied.
Figure 3:
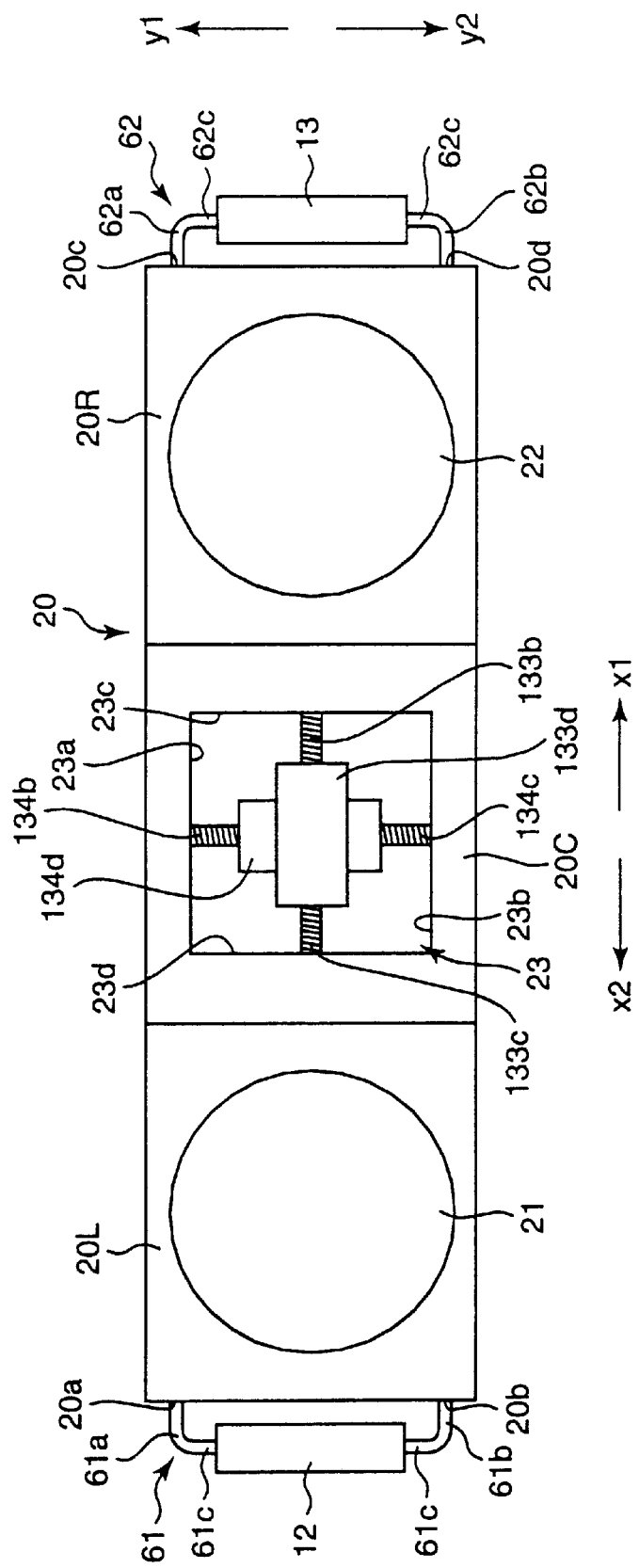
FIG. 3 is a front view of the apparatus shown in FIG. 2.

FIG. 2 is a perspective view showing an apparatus for correcting trembling of a focused image, to which the first embodiment, according to the present invention, is applied, and FIG. 3 is a front view of the tremble correcting apparatus.

A lens holding frame, generally indicated by reference 20, comprises holding portions 20L and 20R, which hold correction lenses 21 and 22, respectively, and a connecting portion 20C which connects the holding portion 20L and the holding portion 20R. The holding portion 20L and the holding portion 20R are plates, symmetrically placed about the connecting portion 20C, being thick enough to hold the correction lenses 21 and 22.

A hole 20a and a hole 20b, which have a predetermined depth, are provided at the top and bottom, respectively, of the left side surface of the holding portion 20L. A central axis of the holes 20a and 20b is parallel to a plane on which the optical axes Ol and Or lie, and extends in the direction perpendicular to the optical axes Ol and Or. Similarly, holes 20c and 20d are provided on the right surface of the holding portion 20R.

A guide bar 61 comprises lateral-direction guide portions 61a and 61b, which are parallel to each other, and a lengthwise-direction guide portion 61c, which connects the lateral-direction guide portions 61a and 61b. The length of the lengthwise-direction guide portion 61c, along its central axis, approximately equals a distance between the holes 20a and 20b. The lateral-direction guide portion 61a is slidably received by the hole 20a, and the lateral-direction guide portion 61b is slidably received by the hole 20b.

A guide bar 62 comprises lateral-direction guide portions 62a and 62b, which are parallel to each other, and a lengthwise-direction guide portion 62c, which connects the lateral-direction guide portions 62a and 62b. The length of the lengthwise-direction guide portion 62c, along its central axis, approximately equals a distance between the holes 20c and 20d. The lateral-direction guide portion 62a is slidably received by the hole 20c, and the lateral-direction guide portion 62b is slidably received by the hole 20d.

Namely, the lens holding frame 20 is supported by the guide bars 61 and 62, and can be moved, in the lateral direction, between the extremes of the leading-end faces of the lateral-direction guide portions 61a and 61b abutting the bottom-end faces of the holes 20a and 20b, and the leading-end faces of the lateral-direction guide portions 62a and 62b abutting the bottom-end faces of the holes 20c and 20d.

The lengthwise-direction guide portion 61c is supported by a projecting portion 12, formed on the inner surface of the outer frame of the binoculars 1, so as to be slidable in a longitudinal direction along the central axis thereof. Similarly, The lengthwise-direction guide portion 62c is supported by a projecting portion 13, formed on the inner surface of the outer frame of the binoculars 1, so as to be slidable in a longitudinal direction along the central axis thereof.

A configuration of the connecting portion 20C is cuboid, in which a through-hole 23 is formed. The through-hole 23 is defined by internal surfaces 23a and 23b, facing each other, which are parallel to the plane in which the optical axes Ol and Or lie, and internal surfaces 23c and 23d, facing each other, which are perpendicular to the internal surfaces 23a and 23b.

A first direct-drive-type actuator, generally indicated by reference 133, and a second direct-drive-type actuator, generally indicated by reference 134, are disposed in the opening 23. The first direct-drive-type actuator 133 comprises a stepping motor 133a, and shaft portions 133b, 133c (movable portions). The shaft portions 133b and 133c are portions of one shaft member. The stepping motor 133a comprises a motor case 133d and a rotor (omitted in FIGS. 2 and 3) mounted in the motor case 133d. The rotor can be rotated in forward and reverse directions around a central longitudinal axis of the shaft portions 133b and 133c. The motor case 133d is fixed on the inner surface (omitted in FIGS. 2 and 3) of the binoculars 1.

The shaft portions 133b and 133c are supported so as to be movable in the longitudinal direction thereof and rotatable in accordance with the rotational operation of the rotor. Threads (omitted in FIGS. 2 and 3) are formed on the outer surface of the shaft portions 133b and 133c, and the shaft portions 133b and 133c are respectively engaged with a female thread (not shown) formed on the inner surface of a quill of the motor case 133d.

Namely, when the rotor is rotated in the forward direction, the shaft portion 133b extends and the shaft portion 133c retracts in the longitudinal direction thereof, with a forward rotation. When the rotor is rotated in the reverse direction, the shaft portion 133b retracts and the shaft portion 133c extends in the longitudinal direction thereof with a reverse rotation. A tip (projecting end-face) of the shaft portion 133b is in slidable contact with the surface 23c at all times, and a tip (projecting end-face) of the shaft portion 133c is in slidable contact with the surface 23d at all times.

In other words, the rotational movement of the rotor of the stepping motor 133a is transmitted to the lens holding frame 20, after being converted to a lateral linear movement by the shaft portion 133b, through a screw feeder mechanism (transmitting mechanism) which comprises: the shaft portions 133b and 133c (movable portion), the threads formed on the outer surface of the shaft portions 133b and 133c; and the female thread, formed on the inner surface of the quill of the motor case 133d, which are threadingly engaged with the threads of the shaft portions 133b and 133c.

The second direct-drive-type actuator, generally indicated by reference 134, has a construction similar to that of the first direct-drive-type actuator 133. A rotor of a stepping motor 134a can be rotated in forward and reverse directions around a central longitudinal axis of the motor case 134d. When the rotor is rotated in the forward direction, a shaft portion 134b extends and a shaft portion 134c retracts in a longitudinal direction thereof, with a forward rotation. When the rotor is rotated in the reverse direction, the shaft portion 134b retracts and the shaft portion 134c extends in the longitudinal direction thereof, with a reverse rotation. A tip of the shaft portion 134b is in slidable contact with the surface 23a at all times, and a tip of the shaft portion 134c is in slidable contact with the surface 23b at all times. Note that, the shaft portions 134b and 134c are portions of one shaft member.

When the rotor of the stepping motor 133a is rotated in the forward direction, the shaft portion 133b extends in a direction x1 (see FIG. 3) and the shaft portion 133c retracts, so that the lens holding frame 20 is moved in the direction x1. On the other hand, when the rotor of the stepping motor 133a is rotated in the reverse direction, the shaft portion 133b retracts and the shaft portion 133c extends in a direction x2 (see FIG. 3), so that the lens holding frame 20 is moved in the direction x2.

When the rotor of the stepping motor 134a is rotated in the forward direction, the shaft portion 134b extends in a direction y1 (see FIG. 3) and the shaft portion 134c retracts, so that the lens holding frame 20 is moved in the direction y1. On the other hand, when the rotor of the stepping motor 134a is rotated in the reverse direction, the shaft portion 134b retracts and the shaft portion 134c extends in a direction y2 (see FIG. 3), so that the lens holding frame 20 is moved in the direction y2.

Namely, similarly to the lateral direction, the rotational movement of the rotor of the stepping motor 134a is transmitted to the lens holding frame 20, after being converted to a lengthwise linear movement by the shaft portions 134b and 134c, through a screw feeder mechanism (transmitting mechanism) which comprises: the shaft portions 134b and 134c(movable portion), threads formed on the outer surface of the shaft portions 134b and 134c; and a female thread, formed on an inner surface of a quill of the motor case 134d, which are threadingly engaged with the threads of the shaft portions 134b and 134c.

Note that, in this specification, one drive step refers to a unit movement by which the stepping motors 133a and 134a are driven, and one step driving amount refers to a rotational displacement of the shaft portions 133b, 133c, 134b, 134c when each of the stepping motors 133a and 134a is driven by one drive step.

As shown in FIG. 1, the above-described apparatus is incorporated in the binoculars 1, in such a manner that the correction lenses 21 and 22 are respectively positioned between the objective lenses 31, 32 and the eyepieces 51, 52, along the optical paths of the objective lenses 31, 32 and are displaced about the optical paths.

In this embodiment, a linear stepping actuator SPS20 (COPAL ELECTRONICS CO., LTD.) is utilized as the first and second direct-drive-type actuators 133, 134. The step size of SPS20 is 25μm. Namely, the pitch of threads formed on the shaft portions 133b, 133c, 134b and 134c is made such that the shaft portions extend or retract by 25 μm in accordance with one drive step.

In the linear stepping actuator, a driving amount of an object driven by the motor is relatively small, in comparison with the rotational amount of the motor. In other words, the linear stepping actuator includes a driving force transmitting mechanism a deceleration of which is large. Accordingly, a drive of a small amount can be carried out by the linear stepping actuator.

FIG. 4 is a block diagram indicating a correction lens driving circuit which corrects a movement of the optical axis in the lateral direction.

A lateral-direction gyro sensor 201 detects an angular speed of the optical axes (Ol, Or) of the binoculars 1 in the lateral direction, and outputs a voltage signal according to the angular speed. The voltage signal, outputted from the lateral-direction gyro sensor 201, is input to the CPU 203 through an A/D conversion input terminal AD, after being amplified by a lateral-direction amplifier 202. The voltage signal is converted to a digital signal by the A/D conversion input terminal. In the CPU 203, the digital signal is subjected to predetermined operations, such as an integration, and a control signal of two bits is generated. The control signal is output through output ports PO0 and PO1. A lateral-direction driving circuit 204 is connected to the output ports PO0 and PO1. In the lateral-direction driving circuit 204, a driving signal of the first direct-drive-type actuator 133 is generated based on the control signal input from the CPU 203. The driving signal is output through output terminals C0, C1, C2 and C3.

Driving coils of a stator of the stepping motor 133a of the first direct-drive-type actuator 133 are connected to the output terminals C0, C1, C2 and C3. In accordance with the driving signal, an electric current flows in a predetermined direction through the driving coils, so that the rotor of the stepping motor 133a is rotated in a predetermined direction.

A control terminal of a switch 207, for example a transistor, is connected to an output port PO2 of the CPU 203 through a resistance R1. Another terminal of the switch 207 is connected to the driving circuit 204. The switch 207 is turned ON and OFF in accordance with a control signal output from the output port PO2, so that an electric power supply to the driving circuit 204 is started and stopped.

An oscillator 206 is connected to an input port PI of the CPU 203. The oscillator 206 generates a timing clock pulse signal for the A/D conversion, which is output therefrom. In accordance with the pulse signal outputted from the oscillator 206, the A/D conversion is performed in the A/D conversion input terminal AD.

As described above, the rotor of the stepping motor 133a is rotated in the forward or the reverse directions by a predetermined number of pulses, based on the angular speed of the optical axes (Ol, Or) of the binoculars 1 in the lateral direction, detected by the lateral-direction gyro sensor 201. Accordingly, the lens holding frame 20 is moved, thereby canceling the movement of the focused image in the lateral direction, so that the trembling of the focused imaged is corrected.

Note that a lengthwise-direction gyro sensor, a lengthwise-direction amplifier and a lengthwise-direction driving circuit (which are omitted in FIG. 4) are also connected to the CPU 203, in order to correct a trembling of the focused image in the lengthwise direction, and perform a similar operation to that in the lateral direction. As described above, the first actuator 133 is connected to the lateral-direction driving circuit. Similarly, the second actuator 134 is connected to the lengthwise-direction driving circuit. The stepping motor 134a of the second actuator 134 is driven based on the driving signal output from the lengthwise-direction driving circuit, thereby correcting the trembling of the focused image in the lengthwise direction.

Figure 5A:
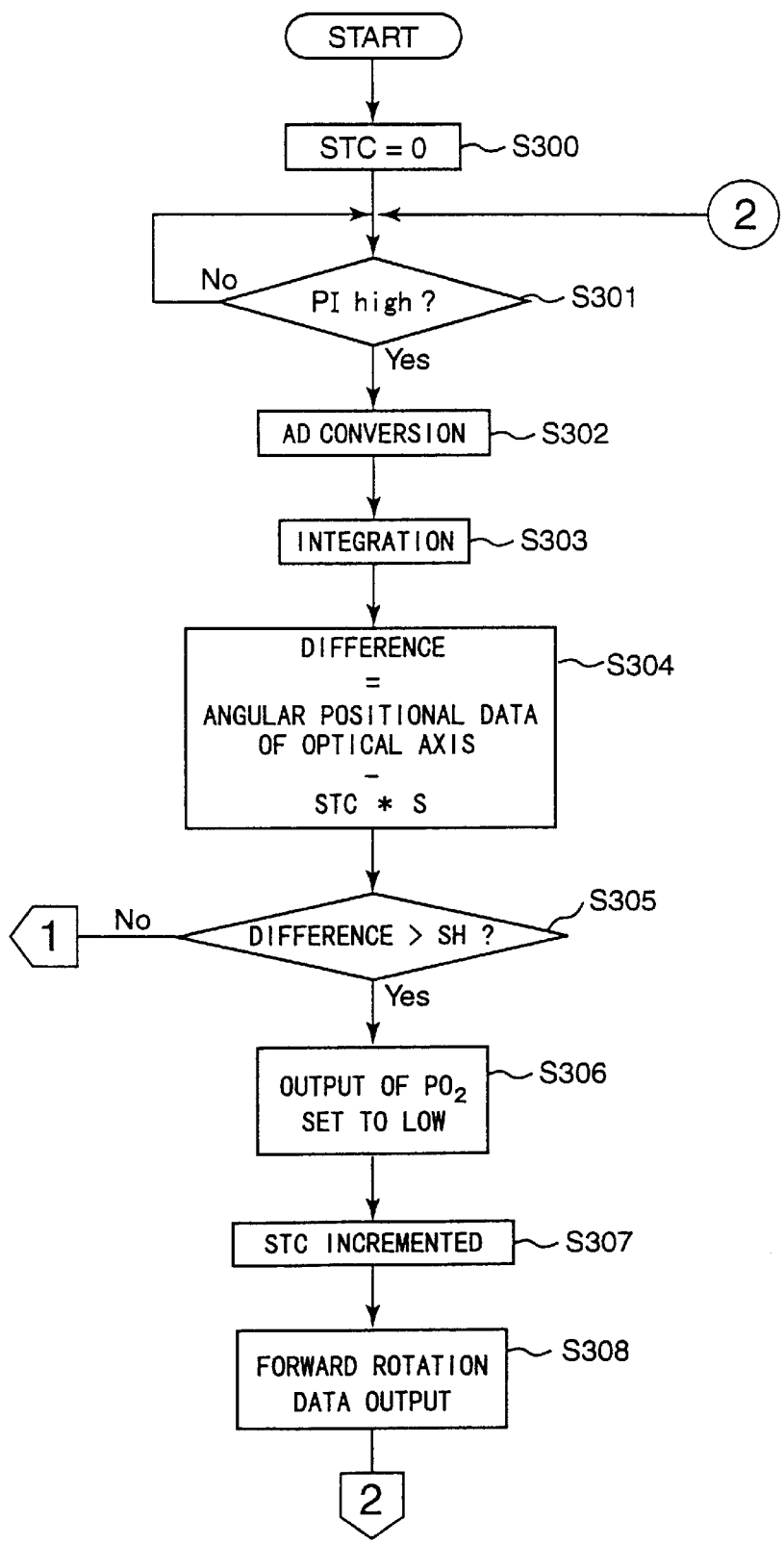
FIGS. 5A and 5B show a flowchart of a tremble correcting control of a first embodiment.
Figure 5B:
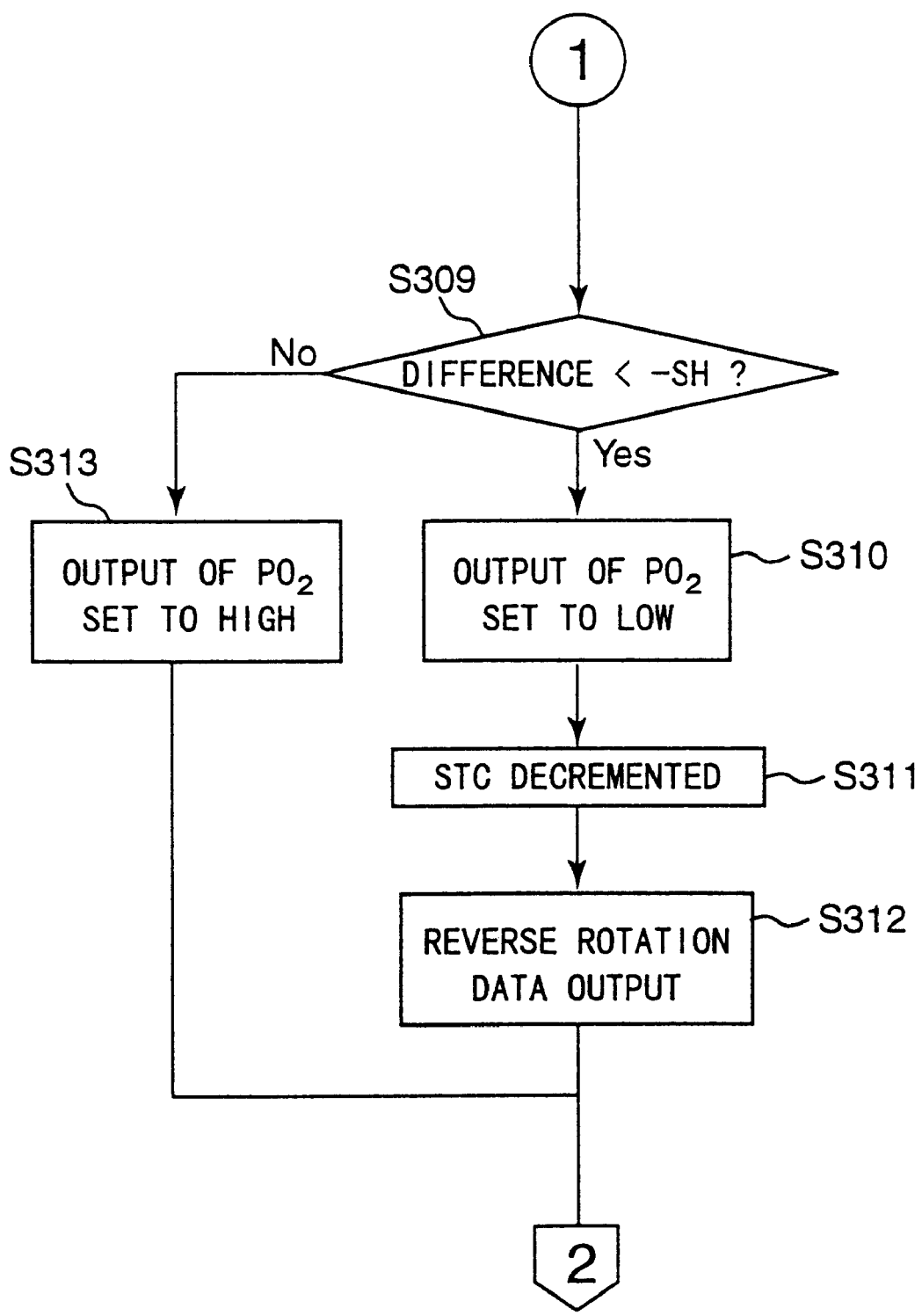

FIG. 5A is a portion of a flowchart indicating a procedure of a tremble correcting control in the lateral direction, according to the first embodiment, and FIG. 5B is a remaining portion of the flowchart.

When a switch (not shown) of the binoculars 1 is operated, the procedure starts. In step S300, a variable STC is initialized. An accumulated step number of the rotor of the stepping motor 133a (see FIG. 2) is set to the variable STC. When the rotor rotates in the forward direction, the step number is added to the variable STC, and when the rotor rotates in the reverse direction, the step number is subtracted from the STC. In step S301, it is checked whether an input signal to the input port PI (see FIG. 4) is HIGH or LOW. If the input signal is HIGH, namely, if the pulse signal is detected by the input port PI, the process goes to step S302. When the oscillator 206 (see FIG. 3) is not active and the pulse signal is not detected, the process does not go to step S302. In other words, procedures after step S302 are performed each time the pulse signal is output from the oscillator 206.

In step S302, the voltage signal output from the gyro sensor 201 is converted to digital data by the A/D conversion input terminal AD, after being amplified by the amplifier 202. In step S303, the digital data is integrated. Namely, the digital data of the voltage signal output from the gyro sensor 201 is accumulated each time the AD conversion is performed. As described above, with respect to the lateral direction, angular positional data of the optical axes Ol and Or of the binoculars 1 is thus calculated.

In step S304, a difference between the angular positional data of the optical axes Ol, Or in the lateral direction and a value calculated by multiplying the variable STC by a driving amount S is calculated. The driving amount S is a driving amount of the lens holding frame 20 corresponding to the one drive step of the stepping motor 133a. Namely, in step S304, a difference between the angular positional data and positional data of the correction lenses 21 and 22, which indicates a distance from a standard position thereof, is calculated. Note that the optical axes of the correction lenses 21 and 22 are coaxial with optical axes Ol, Or of the other optical systems of the binoculars 1 when the correction lenses 21 and 22 are disposed at the standard position.

In step S305, the difference is compared with a positive threshold value SH. If the difference is larger than the positive threshold value SH, the process goes to step S306, and if the difference is less than or equal to the positive threshold value SH, the process goes to step S309 of FIG. 5B. Note that, in the first embodiment, the positive threshold value SH is pre-set to qual the driving amount S.

The angular positional data of the optical axes Ol, Or of the binoculars 1 is calculated by integrating the output voltage of the lateral-direction gyro sensor 201. The step number of the forward rotation of the rotor, by which the lens holding frame 20 is moved in the direction x1, is added to the variable STC, and the step number of the reverse rotation of the rotor, by which the lens holding frame 20 is moved in the direction x2, is subtracted from the variable STC. Accordingly, when the difference is larger than the positive threshold value SH, the angular positional data in the lateral direction exceeds the current positional data (STC*S) of the correction lenses 21 and 22 by an amount greater than or equal to the driving amount S of the lens holding frame 20.

In step S306, the control signal output from the output port PO2 is set LOW. When the control signal of the port PO2 is LOW, the switch 207 is turned ON, so that the lateraldirection driving circuit 204 becomes electrically energized.

In step S307, the variable STC is incremented, and in step S308, a control signal, by which the stepping motor 133a is rotated in the forward direction by the one drive step, is output from the output ports PO0 and PO1. Due to step S306 electrically energizing the driving circuit 204, a driving electric current flows in a predetermined direction through a coil of the stator of the stepping motor 133a, according to the control signal of the outputports PO0 and PO1. Therefore, the rotor rotates in the forward direction. The rotational movement of the rotor in the forward direction is transmitted to the lens holding frame 20 as a linear movement through the shaft portion 133b (see FIGS. 1 and 2), so that the lens holding frame 20 is moved in the direction x1. Consequently, the movement of the optical axes Ol, Or of the other optical systems of the binoculars 1 in the direction x2 is canceled by a predetermined amount. Then, the process returns to step S301.

On the other hand, in step S309 of FIG. 5B, the difference is comparedwith a negative threshold value –SH. If the difference is less than the negative threshold value –SH, the process goes to step S310. When the difference is less than the negative threshold value –SH, the angular positional data of the lateral direction is below the current positional data (STC*S) of the correction lenses 21 and 22 by the amount greater than or equal to the driving amount S. In step S310, the control signal output from the output port PO2 is set to LOW. When the control signal of the port PO2 is LOW, the switch 207 is turned ON, and the lateral-direction driving circuit 204 is electrically energized.

In step S311, the variable STC is decremented, and in step S312, a control signal, by which the stepping motor 133a is rotated in the reverse direction by one drive step, is output from the output ports PO0 and PO1. Due to step S310 electrically energizing the driving circuit 204, the driving electric current flows in a predetermined direction through the coil of the stator of the stepping motor 133a, according to the control signal of the output ports PO0 and PO1. Therefore, the rotor rotates in the reverse direction. The rotational movement of the rotor in the reverse direction is transmitted to the lens holding frame 20 as a linear movement through the shaft portion 133c, so that the lens holding frame 20 is moved in the direction x2. Consequently, the movement of the optical axes Ol, Or of the other optical systems of the binoculars 1 in the direction x1 is canceled by a predetermined amount. Then, the process returns to step S301 of FIG. 5A.

If it is determined in step S309 that the difference is larger than the negative threshold value –SH, the process goes to step S313. In step S313, the control signal output from the output port PO2 is set to HIGH. When the control signal of the port PO2 is HIGH, the switch 207 is turned OFF, so that the electric power supply to the lateral-direction driving circuit 204 is stopped. Then, the process returns to step S301 of FIG. 5.

With reference to FIGS. 6A, 6B and 6C, the operation of the first embodiment will be explained. FIG. 6A is a graph indicating a focused image trembling signal of the binoculars 1 and the driving amount of the correction lenses 21 and 22. FIG. 6C is a graph indicating the driving electric current which flows through the coil of the stator of the stepping motor 133a when electrically energized in order to drive the correction lenses 21 and 22. Note that, an absolute value of the threshold value SH is pre-set to the moving amount S of the lens holding frame 20.

In FIG. 6A, a curve 6a indicates the focused image trembling signal, i.e., a moving amount of the binoculars 1, calculated by integrating the output of the gyro sensor 201. A line 6b indicates a moving amount of the correction lenses 21 and 22, i.e., the resulting value of the multiplication of the variable STC and the driving amount S of the lens holding frame 20 corresponding to one drive step rotation of the rotor of the stepping motor 133a. In FIG. 6B, a line 6c indicates the driving electric current, which flows through the coil of the stator of the stepping motor 133a when the stepping motor 133a is controlled by a conventional operation. In FIG. 6C, a line 6d indicates the driving electric current of the coil when the stepping motor 133a is controlled by the operation to which the first embodiment is applied. Further, broken lines 6e1, 6e2 and an arrow 6f of FIG. 6A are described later.

In FIG. 6A, when the difference between the focused image trembling signal and the moving amount of the correction lenses exceeds the absolute value of the threshold value SH (which equals the driving amount S of the lens holding frame 20, in the first embodiment), the line 6b indicates a stepped-increase or a stepped-decrease. Namely, at t1, t2, t3, t4, t6, t10, t12, t13, t14 and t15, the lens holding frame 20 is driven. On the other hand, at t5, t7, t8, t9 and t11, the lens holding frame 20 is not driven, because the difference between the focused image trembling signal and the moving amount of the correction lenses is within a range from the positive threshold value SH to the negative threshold value −SH.

Under the conventional operation, the driving electric current flows through the coil at all times as line 6c indicates in FIG. 6B, even if the lens holding frame 20 is not driven.

To the contrary, as shown in FIG. 6C, under the operation of the first embodiment, the electric power supply to the lateral-direction driving circuit 204 is stopped when it is unnecessary to drive the lens holding frame 20, such as at t5, t7, t8, t9 and t11, so that the driving electric current flowing through the coil of the stator of the stepping motor 133a is halted.

As described above, in the first embodiment, only when the difference between the angular positional data of the binoculars 1 and the positional data of the correction lenses 21 and 22, which indicates a distance from the standard position, is out of the range from the positive threshold value SH to the negative threshold value −SH (i.e. only when the lens holding frame 20 should be driven for the tremble correction), is the electric power is supplied to the driving circuit 204, so that the driving electric current flows through the coil of the stepping motor 133a. When the difference between the angular positional data and the positional data of the correction lenses 21 and 22 is within the range from the positive threshold value SH to the negative threshold value −SH (i.e. when the lens holding frame 20 is not to be driven, the electric power supply to the driving circuit 204 is stopped, so that the driving electric current does not flow through the coil of the stepping motor 133a. Accordingly, the consumption of electric power is reduced and the binoculars become increasingly economical.

Figure 7:
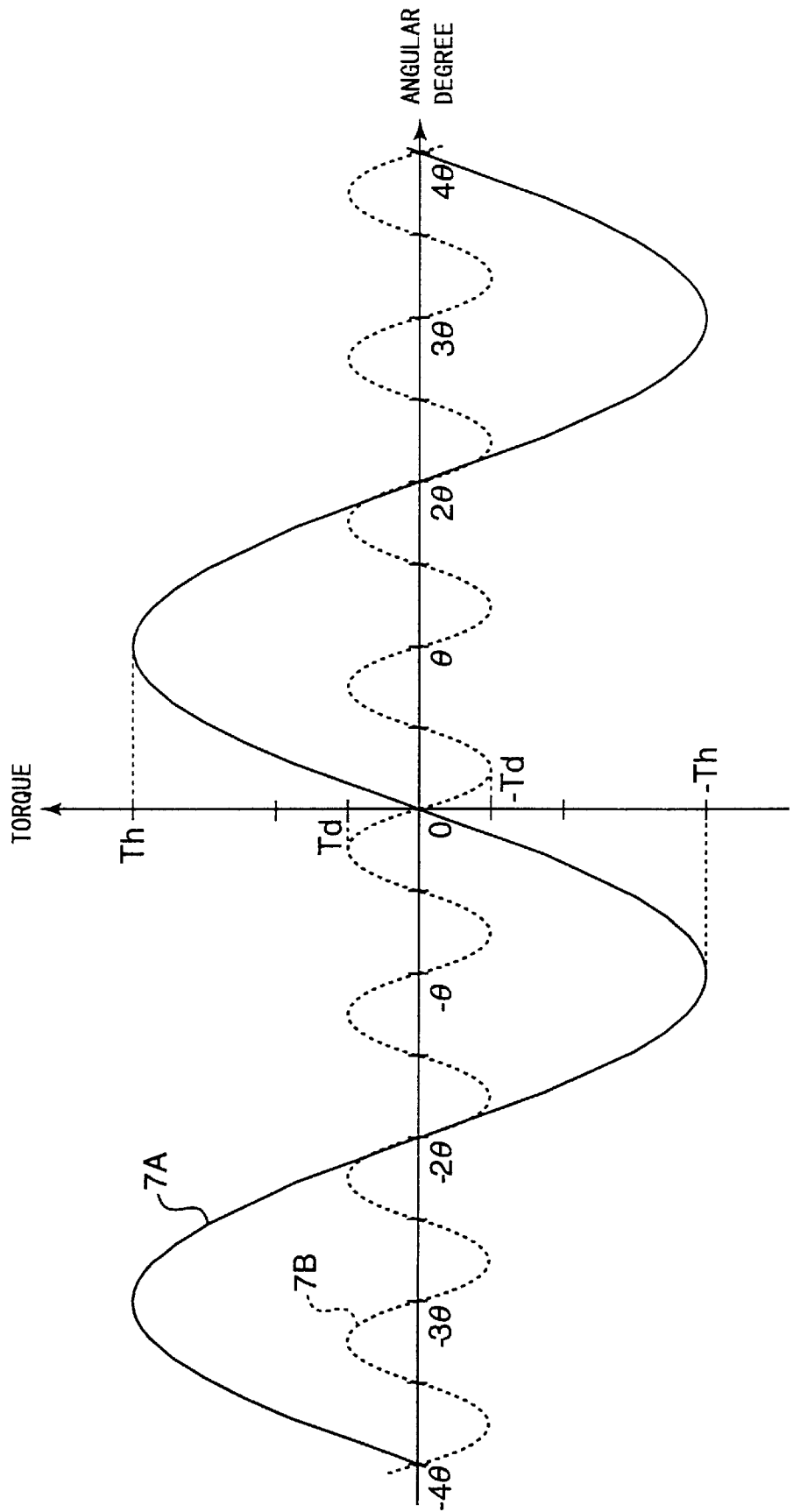
FIG. 7 is a graph indicating a torque curve of a rotor of a stepping motor.

With reference to FIG. 7, maintaining the position of the rotor in a state when the stepping motor 133a is electrically de-energized will be explained. FIG. 7 is a graph indicating torque generated when the rotor of the stepping motor 133a is rotated by externally applied forces. In FIG. 7, the ordinate represents torque, and the abscissa represents a rotational angular degree of the rotor. A curve 7A is a torque curve indicating torque generated when the electric current flows through the coil in order to keep the rotor at a predetermined position (an angle of 0 degrees). A curve 7B is a torque curve indicating torque generated when the coil becomes electrically de-energized in a state when the rotor is placed at the angle of 0 degrees by supplying the electric current to the coil.

As the curve 7A shows, if an external torque, which is applies to the rotor, exceeds a holding torque Th in a state when the coil is electrically energized and the rotor is stopped at the angle of 0 degrees, the rotor rotates. In other words, when the external torque is smaller than the holding torque Th, the rotor has an ability of maintaining a position within ±θ degrees of a present position.

On the other hand, if the external torque exceeds a detent torque Td, which is less than the holding torque Th, in a state when the coil is electrically de-energized, the rotor rotates. If the external torque is less than the detent torque Td, the rotor has an ability of maintaining a position within ±θ/4 degrees of the present position. Namely, while the coil is electrically de-energized, the rotor can be rotated with a small externally applied force. Note that the detent torque means a maximum torque able to be generated by the rotor, in order to maintain a position and to resist an external torque to rotate the rotor when the coil is not excited.

As described above, in the first embodiment, the screw feeder mechanism is utilized to transmit the rotational movement of the stepping motor 133a to the lens holding frame as a linear movement. If a force is externally applied to the binoculars 1 in a state when the coil is electrically de-energized, the externally applied force is usually transmitted in a thrust direction of the screw feeder mechanism, namely, in a direction in which the movable member of the screw feeder mechanism moves. However, due to the existence of the male and female threads the externally applied force is transmitted in the rotational direction of the rotor, therefore enabling a deceleration mechanism to be applied to the shaft of the screw feeder mechanism, which dissipates the force by a predetermined deceleration, so that torque which exceeds the detent torque Td is not generated.

Note that, with respect to a tremble correction in the lengthwise direction, a similar operation to that of the lateral direction described above is performed.

Figure 8A:
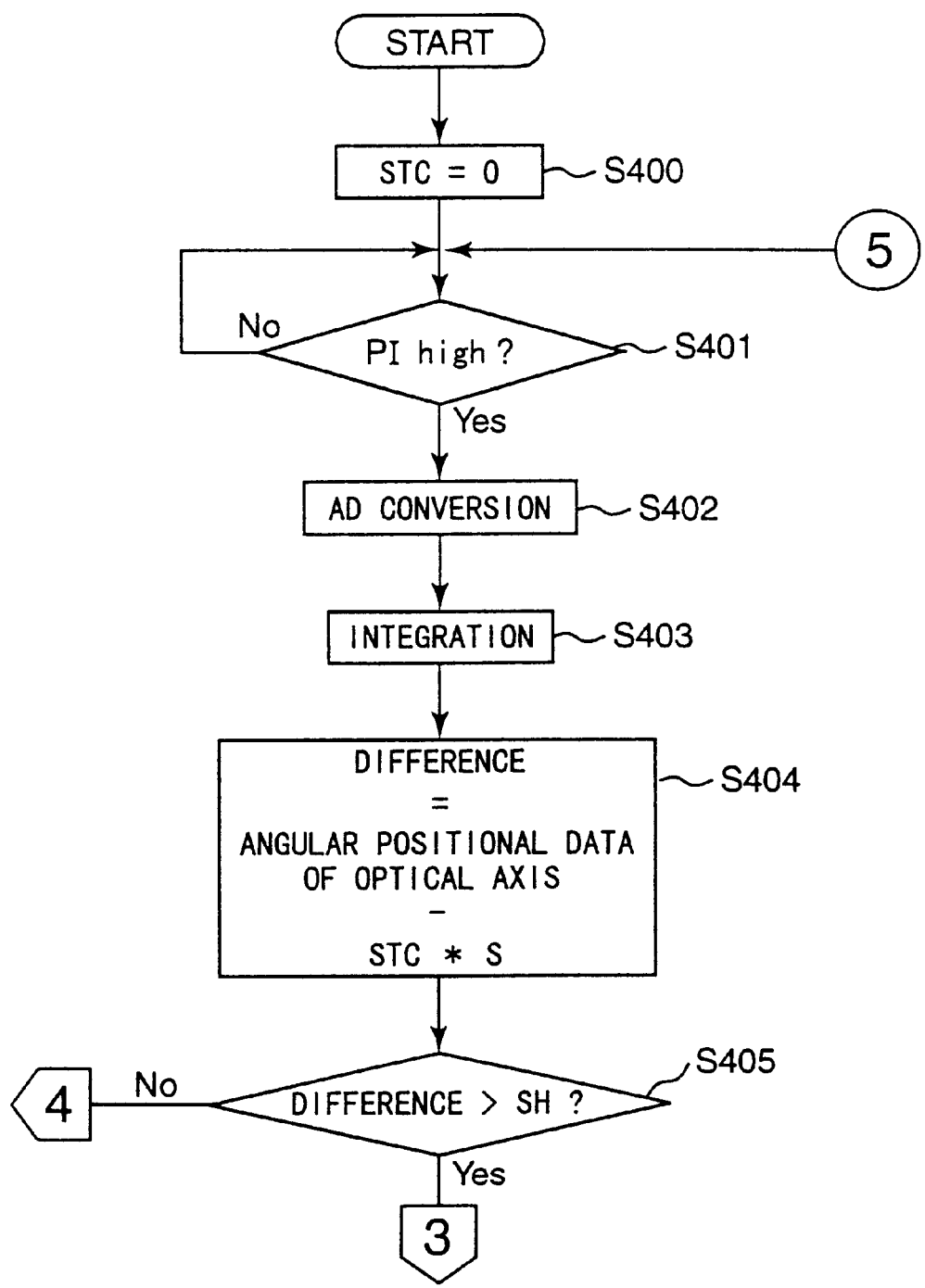
FIGS. 8A, 8B and 8C show a flowchart of a tremble correcting control of a second embodiment.
Figure 8B:
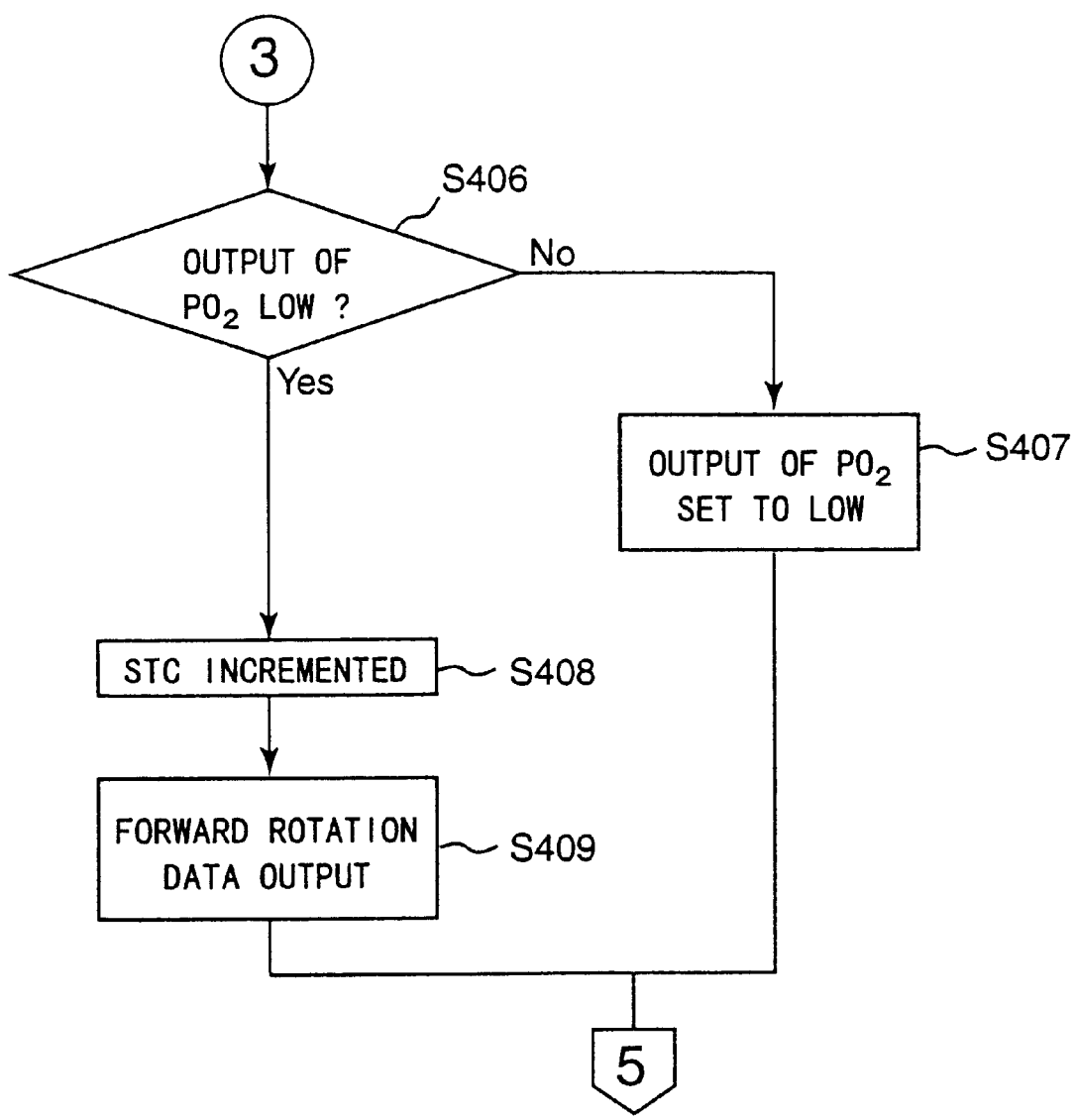
Figure 8C:
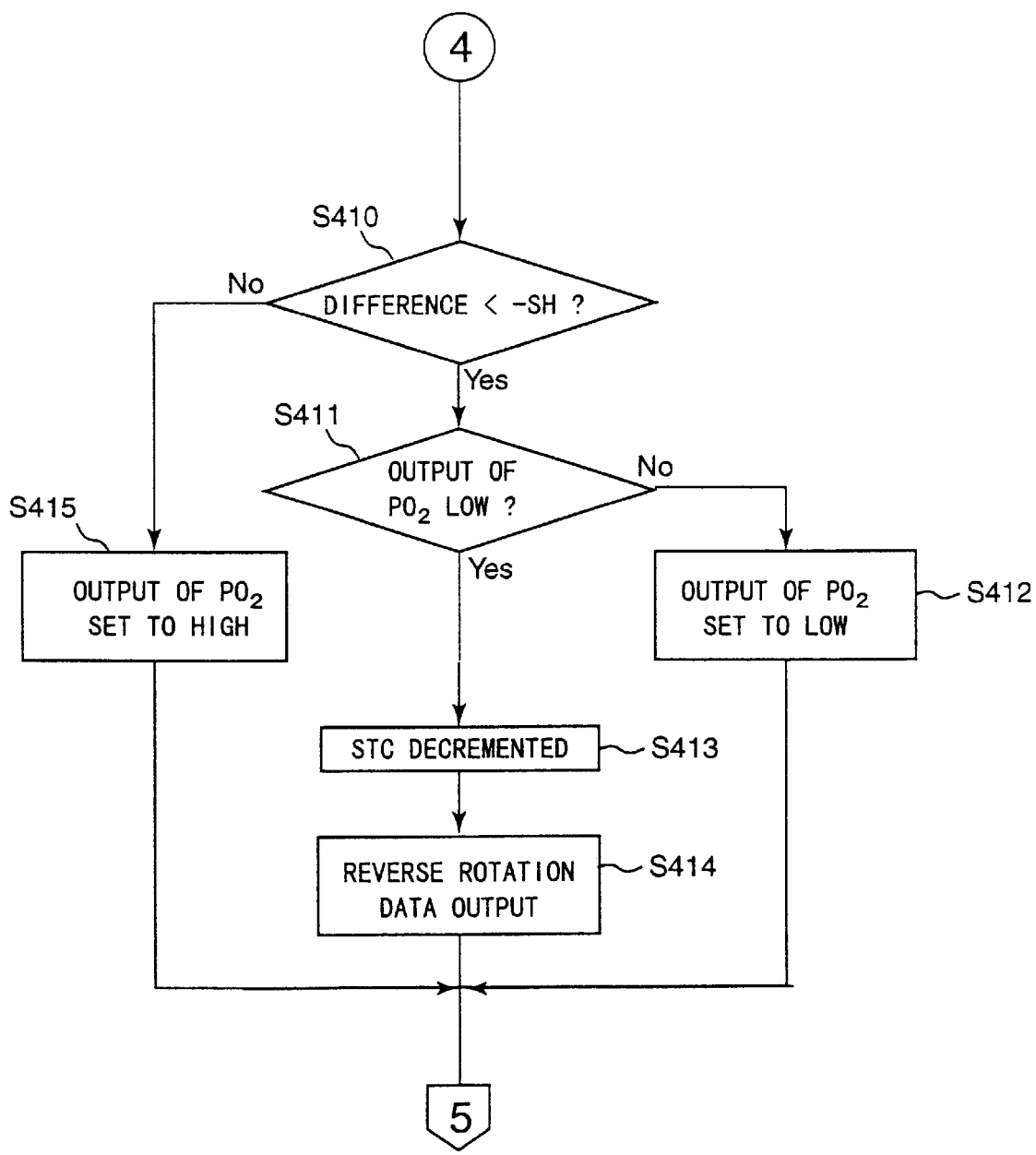

A flowchart indicating a procedure of a tremble correcting control in the lateral direction, according to a second embodiment is shown in FIGS. 8A, 8B, 8C. Note that the second embodiment is applied to the tremble correcting apparatus of the first embodiment shown in FIGS. 2 and 3. Further, a construction of circuits is similar to that of the first embodiment, shown in FIG. 4.

The procedures from step S400 through step S404 are similar to the procedures from step S300 through step S304, respectively, of FIG. 5. Namely, the angular positional data of the optical axes Ol, Or of the binoculars 1 is calculated by integrating the voltage signal output from the gyro sensor 201, and the difference between the angular positional data and the accumulated driving amount of the stepping motor 133a (STC*S) is calculated.

In step S405, the difference is compared with the positive threshold value SH, which is pre-set to equal the driving amount S of the lens holding frame 20. If the difference is larger than the positive threshold value SH, the process goes to step S406 of FIG. 8B, and if the difference is less than or equal to the positive threshold value SH, the process goes to step S410 of FIG. 8C.

In step S406, it is checked whether the control signal output from the output port PO2 is LOW. When it is determined in step S406 that the control signal of the port PO2 is LOW, it is deemed that: when this routine was previously performed, the pulse of the input port PI was detected (S401), so that the switch 207 was turned ON, the control signal of the lateral-direction driving circuit was output to the stepping motor 133a, and the stepping motor 133a was driven. When it is determined in step S406 that the control signal of the port PO2 is HIGH, it is deemed that: when this routine was previously performed, the switch 207 was turned OFF and the stepping motor 133a was not driven.

If it is determined that the control signal of the output port PO2 is HIGH, the process goes to step S407. In step S407, the control signal of the output port PO2 is set LOW, and the process returns to step S401 of FIG. 8A. Namely, the stepping motor 133a becomes ready to be driven.

If it is determined that the control signal of the output port PO2 is LOW, the process goes to step S408 and then to step S409. Procedures performed in steps S408 and S409 are similar to those of steps S307 and S308 of FIG. 5A. Namely, the variable STC is incremented, and the control signal, by which the stepping motor 133a is rotated in the forward direction by one drive step, is output from the output ports PO0 and PO1. Electric current flows through the coil of the stepping motor 133a in a predetermined direction based on the control signal of the output ports PO0 and PO1, so that the rotor rotates in the forward direction. In accordance with the forward rotation of the rotor, the lens holding frame 20 is driven in the direction x1, so that the movement of the optical axes Ol, Or of the other optical systems of the binoculars 1, in the direction x2, is canceled by a predetermined amount. Then, the process returns to step S401 of FIG. 8A.

On the other hand, if it is determined in step S405 that the difference is less than or equal to the positive threshold value SH, the process goes to step S410 of FIG. 8C. In step S410, it is checked whether the difference is smaller than the negative threshold value –SH. If it is determined that the difference is less than the negative threshold value –SH, the process goes to step S411.

In step S411, similarly to step S406 of FIG. 8B, it is checked whether the control signal output from the output port PO2 is LOW. Namely, it is checked whether the stepping motor 133a was driven in accordance with the operation of the switch 207 in a previous performance of this routine.

If it is determined in step S411 that the control signal of the output port PO2 is HIGH, the process goes to step S412. In step S412, the control signal of the port PO2 is set LOW, such that the stepping motor 133a becomes ready to be driven, and then the process returns to step S401 of FIG. 8A.

If it is determined in step S411 that the control signal of the port PO2 is LOW, the process goes to step S413 and then to step S414. Procedures performed in steps S413 and S414 are similar to those of steps S311 and S312 of FIG. 5B. Namely, the variable STC is decremented, and the control signal, by which the stepping motor 133a is rotated in the reverse direction by one drive step, is output from the output ports PO0 and PO1. Then, the electric current flows through the coil of the stepping motor 133a in a predetermined direction based on the control signal of the output ports PO0 and PO1, so that the rotor rotates in the reverse direction. In accordance with the reverse rotation of the rotor, the lens holding frame 20 is driven in the direction x2, so that the movement of the optical axes Ol, Or of the other optical systems of the binoculars 1, in the direction x1, is canceled by a predetermined amount. Then, the process returns to step S401 of FIG. 8A.

If it is determined in step S410 that the difference is greater than or equal to the negative threshold value –SH, the process goes to step S415. In step S415, the control signal of the output port PO2 is set HIGH, and the electric power supply to the driving circuit 204 is stopped. Then, the process returns to step S401 of FIG. 8A.

As described above, in the second embodiment, when the difference between the angular positional data of the optical axes of the correction lenses 21, 22 and the driving amount of the stepping motor 133a is beyond the range of the negative threshold value –SH to the positive threshold value SH (i.e. when the process goes to step S411), the corresponding procedures (either S412 or S414) are performed in accordance with the control signal output from the output port PO2. Namely, these procedures (S412 of S414) are each performed based on whether the driving electric current flows through the coil of the stator of the stepping motor 133a.

In steps S412, the electric power supply to the driving circuit 204 starts again, because when the control signal of the output port P2 is HIGH ('NO' in step S411), there is no electric current flowing in the driving circuit 204 and the coil of the stator. On the other hand, similarly to the first embodiment, in step S414, the stepping motor 133a is driven such that the difference is canceled, because when the control signal of the output port P2 is LOW ('YES' in step S411), there is the electric current flowing in the driving circuit 204 and the coil of the stator.

Figure 9:
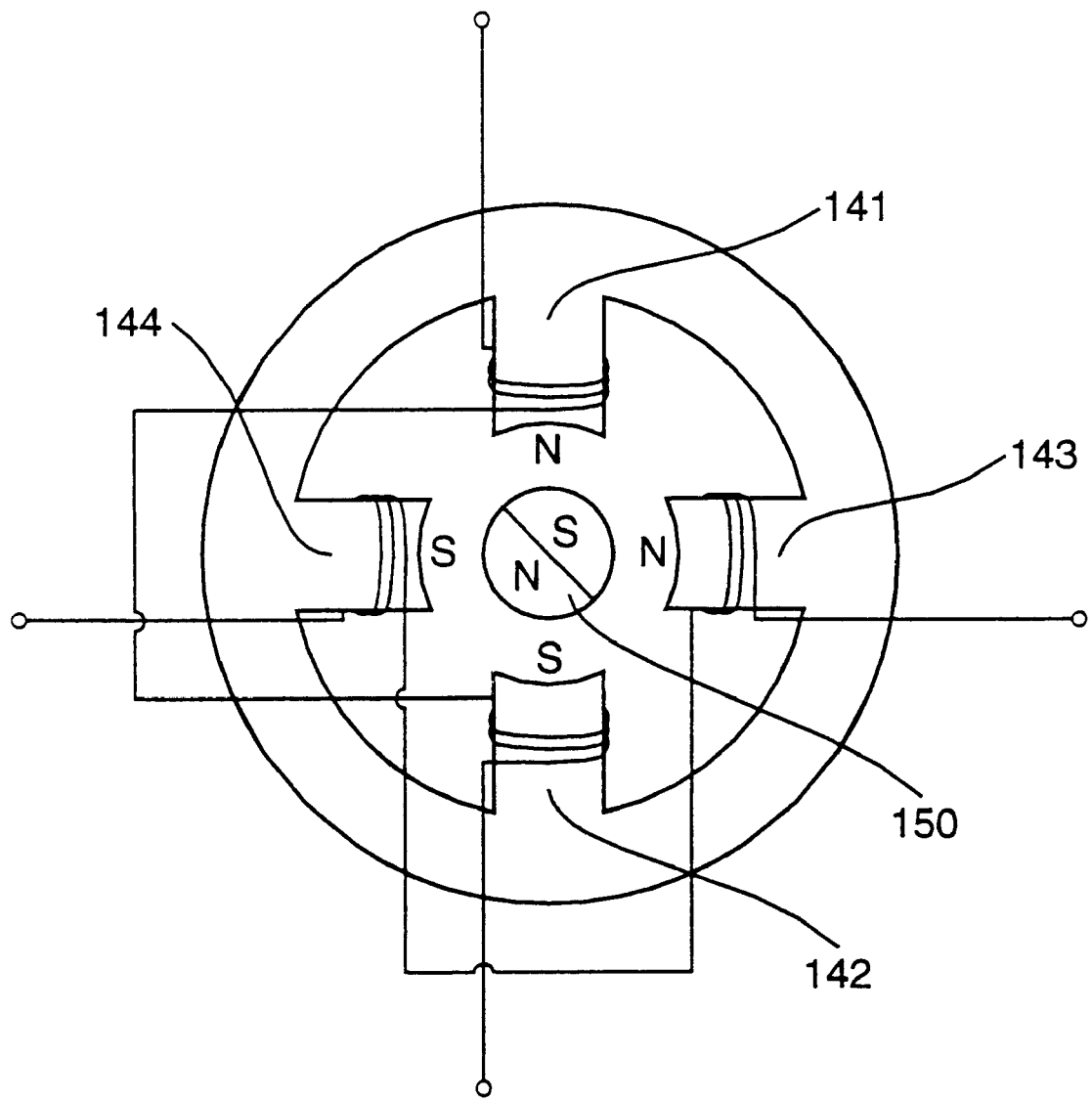
FIG. 9 is a positional relationship between a rotor and a stator while an electric current flows through coils.
Figure 10:
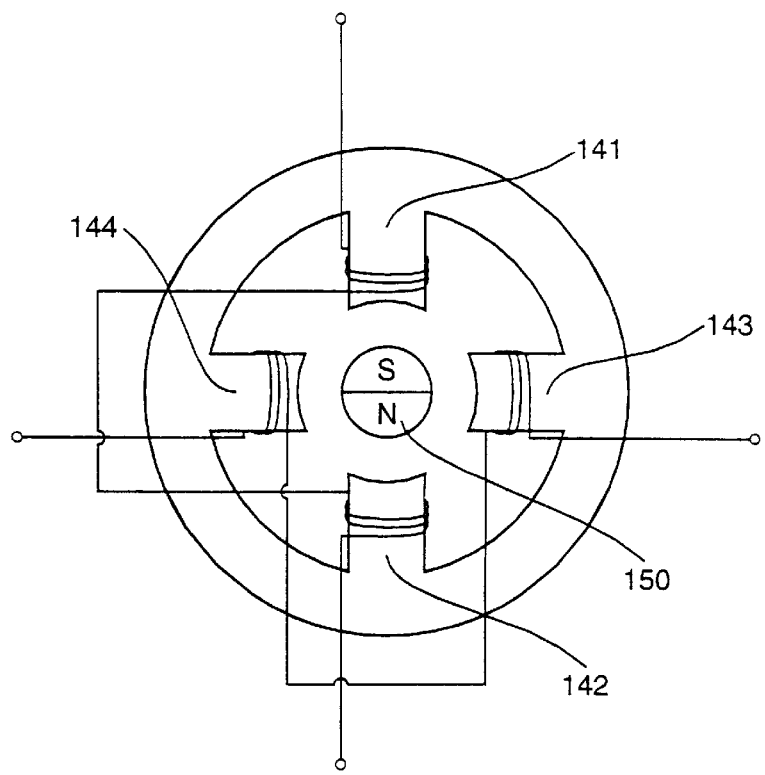
FIG. 10 is a positional relationship between the rotor and the stator when the electric current does not flow through the coils.
Figure 11:
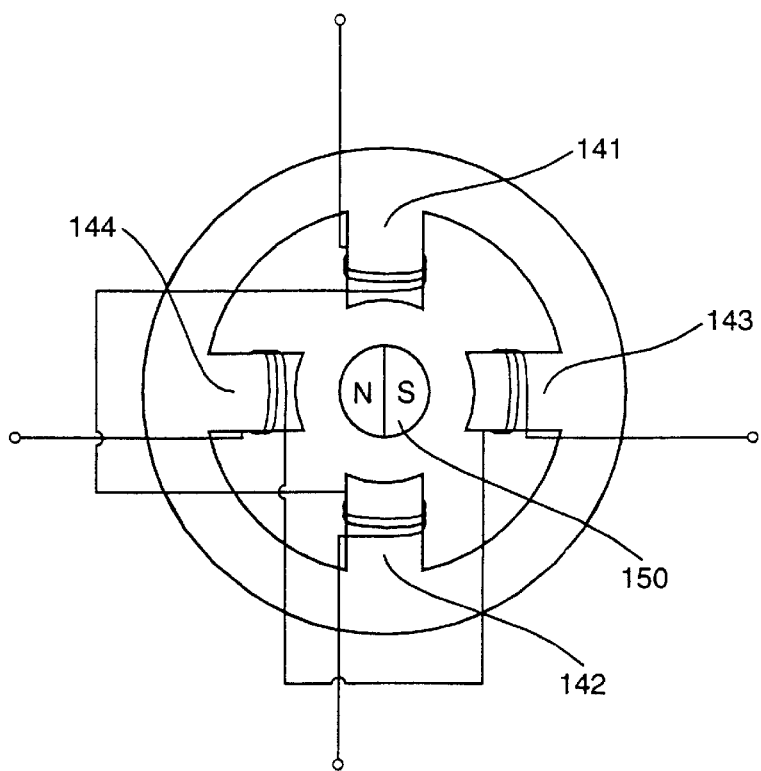
FIG. 11 is another positional relationship between the rotor and the stator when the electric current does not flow through the coils.
Figures 12A, 12B:
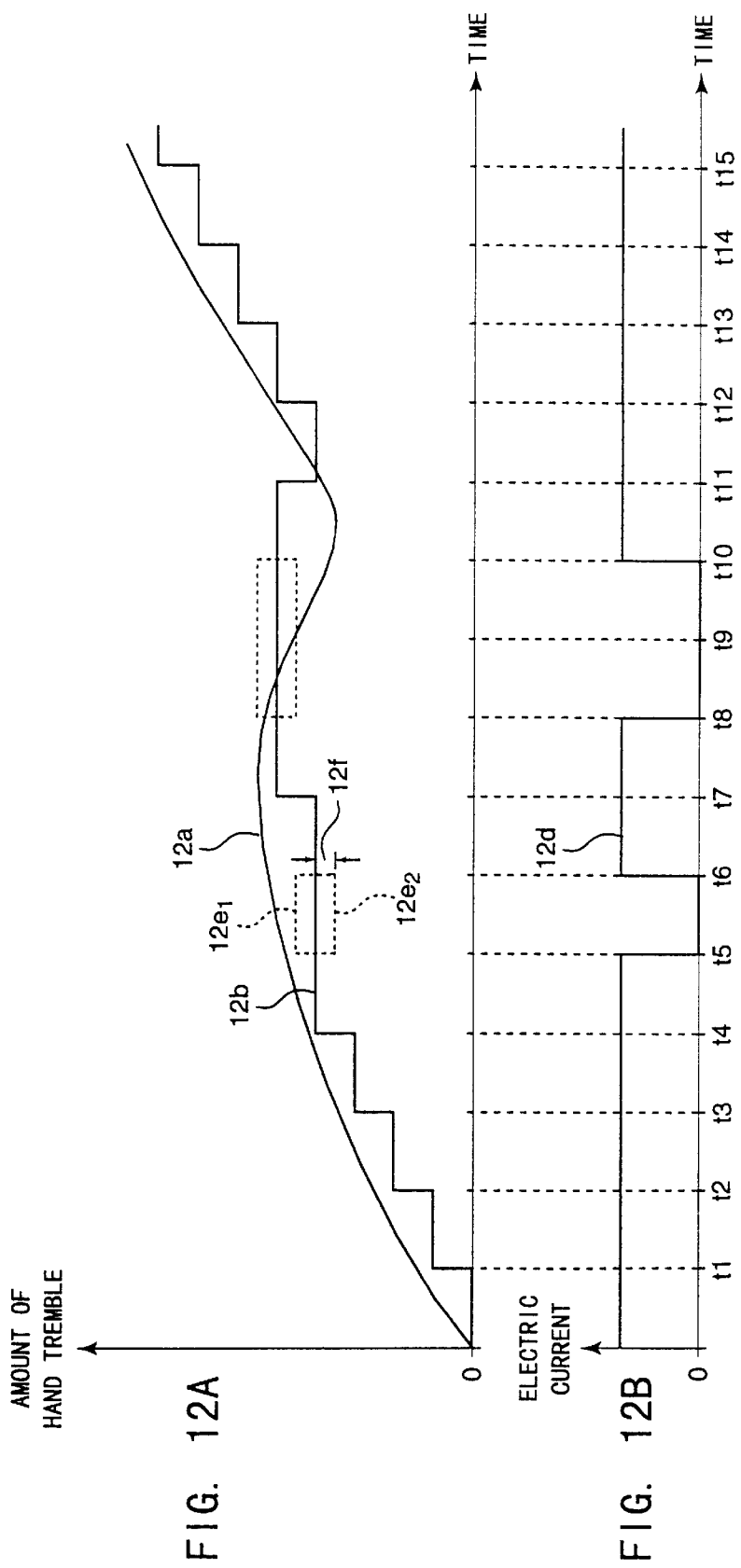
FIG. 12A is a graph indicating a curve of the hand tremble and a movement of the correcting optical system, of the second embodiment.
FIG. 12B is a graph indicating a driving electric current of the stepping motor, due to the second embodiment.

With reference to FIGS. 9 through 11, FIGS. 12A, 12B and 12C, the operation of the second embodiment will be explained. FIGS. 9 through 11 indicate a positional relationship between the rotor and the stator, of the stepping motor 133a. In FIGS. 9 through 11, although a two-phase driven-type stepping motor is shown in order to make an explanation brief, the stepping motor 133a may be any other type of stepping motor. Further, FIG. 12A is a graph indicating a focused image trembling signal of the binoculars 1 and a driving amount of the correction lenses 21 and 22. FIG. 12B is a graph indicating the driving electric current which flows through the coils of the stator in order to drive the correction lenses 21 and 22, in the second embodiment. In FIGS. 12A, and 12B a wave 12a and lines 12b, 12d are respectively identical to those of FIGS. 6A, and 6C.

In FIG. 9, electric current flows through coils wound around arms 141 and 142 on the stator, such that the arm 141 is excited to be a temporary N pole, and the arm 142 is excited to be a temporary S pole. Further, electric current flows through coils wound around arms 143 and 144 on the stator, such that the arm 143 is excited to be a temporary N pole and the arm 144 is excited to be a temporary S pole. In this excited state, a rotor 150 is stably held at a position such that a portion, at which a magnetic force of the temporary N poles is strongest, is disposed between the arm 141 and the arm 143, and a portion, at which a magnetic force of the temporary S pole, is strongest, is disposed between the arm 142 and the arm 144.

If the electric current supply to the coils is stopped, the rotor 150 is stopped as shown in FIG. 9, however the positional stability is lost, and the rotor 150 has a potential of rotating, such that the portions, at which the magnetic forces are strongest, face the arms (141, 142, 143 and 144) which maintain a strongest magnetic force. Accordingly, if the electric power supply to the coils is stopped, the rotor 150 rotates to stop stably at a position shown in FIG. 10 or at a position shown in FIG. 11.

When the coils of the stator of the stepping motor 133a become electrically de-energized at t5 of FIG. 6C, for example, the rotor 150 rotates from the position in FIG. 9, at which the rotor 150 of the electrically energized stepping motor 133a is stopped, to the position of FIG. 10 or FIG. 11, at which the rotor 150 is stably stopped. In accordance with the rotation of the rotor 150, the lens holding frame 20 is moved to a position shifted by a driving amount corresponding to a half of one drive step of the stepping motor 133a. In FIG. 6A, broken lines 6e1 and 6e2 indicate the shifted positions.

Namely, the lens holding frame 20 is theoretically stopped at a position indicated by the line 6b, however, in actuality, the lens holding frame 20 is stopped at a position indicated by the broken line 6e1 or 6e2. Whether the lens holding frame 20 is moved to the position indicated by the broken line 6e1 or the positions indicated by the broken line 6e2, is determined by a direction of an externally applied force to the rotor 150 when the coils are electrically de-energized, and a magnetic force exhibited by each arm (141, 142, 143 and 144).

For example, if the lens holding frame 20 is moved the position of the line 6e2 at t5, the stepping motor 133a should be rotated by one and a half (1.5) drive steps (which corresponds to reference 6f of FIG. 6A) in order to follow the trembling wave when the coils of the stator are electrically energized again. The one and a half (1.5) drive steps rotation may cause a step-out in control of the stepping motor 133a.

In the second embodiment, if the difference between the angular positional data of the optical axes of the binoculars 1 and the accumulated driving amount of the stepping motor 133a is out of the range from the positive threshold value SH to the negative threshold value –SH, the stepping motor 133a is not driven to correct the tremble. If the difference is out of the range and the coils of the stator are electrically de-energized, the coil becomes electrically energized by performing step S407 or step S412 (shown in Figs. 8A and 8B).

Accordingly, the rotor just rotates to stop at the stable position in the case where the coils are electrically energized. When the coils, which are electrically de-energized, become electrically energized, the rotor rotates to stop at a position as shown in FIG. 9. After that, by performing steps S406, S408 and S409, or by performing steps S411, S413 and S414, the stepping drive for canceling the difference is started. Namely, as the line 12b indicates in FIG. 12A, the lens holding frame 20 is not driven at t6 and t10, and the lens holding frame 20 is driven only when the difference between the angular positional data of the optical axes 01, Or of the binoculars 1 and the accumulated driving amount of the stepping motor 133a is out of the range of the positive threshold value SH to the negative threshold value –SH, and the coils are electrically energized, such as at t1 through t4, t7, and t11 through t15. Accordingly, even if the rotor 150 rotates to stop at the position of FIG. 10 or the position of FIG. 11 when the coils become electrically de-energized, the step-out in the control of the stepping motor 133a is prevented when the coils are electrically energized again.

Therefore, according to the present invention, a tremble correcting device which is able to reduce the consumption of electric power, and which is economical, can be obtained.

The present disclosure relates to subject matter contained in the following Japanese Patent Application No.10-277056 (filed on Sep. 30, 1998), which is expressly incorporated herein, by reference, in its entirety.

What is claimed is:

1. A tremble correcting device comprises:
a detector that detects a trembling amount of an optical device;
a correcting optical system that corrects a tremble of a focused image due to said optical device tremble; and
a driving system that includes a stepping motor and a transmitting mechanism, disposed between said stepping motor and said correcting optical system, that converts a rotational movement of said stepping motor to a movement of said correcting optical system, said driving system driving said correcting optical system by a predetermined amount per one step; and
a controlling system that controls said driving system such that, when a difference between said trembling amount detected by said detector and a position data of said correcting optical system, calculated based on a one step driving amount of said driving system, reaches a predetermined threshold, said driving device is driven to cancel said difference by controlling a driving electric current flowing in a coil of said stepping motor;
wherein, when said difference is less than said predetermined threshold, said coil is electrically de-energized by said controlling system; and
a driving circuit that controls said driving electric current; and
a switch that switches an electrical power supply to said driving circuit;
wherein said controlling system controls said switch, so that said electrical power supply is one of started and stopped.

2. The tremble correcting device of claim 1, wherein, when said difference reaches said predetermined threshold, said coil is electrically energized by said controlling system such that a rotor of said stepping motor rotates by a predetermined angular amount unit.

3. The tremble correcting device of claim 1, wherein, when said coil is electrically de-energized and an external force applied to said optical device is transmitted by said stepping motor through said transmitting system, said external force is partially dissipated by said transmitting system so as to be less than a detent torque of said rotor of said stepping motor.

4. The tremble correcting device of claim 1, wherein, when said difference reaches said predetermined threshold and said electric power supply is stopped, said controlling system starts said electric power supply such that said driving electric current flows in said coil in a direction similar to a direction of flow before said stepping of said electric power supply; and when said difference reaches said predetermined threshold and when said electric power is supplied, said controlling system controls a direction of flow of said driving electric current in said coil such that said difference is canceled by driving said stepping motor.

5. The tremble correcting device of claim 4, wherein when said difference reaches said predetermined threshold and said electric power supply is stopped, said controlling system controls a direction of flow of said driving electric current in said coil such that said difference is canceled by driving said stepping motor, after starting said electric power supply.

6. The tremble correcting device of claim 1, wherein said optical device is a pair of binoculars that includes a pair of telephoto optical systems.

7. The tremble correcting device of claim 6, wherein said transmitting mechanism is a screw feeder mechanism.

8. A tremble correcting device comprises:
   a detector that detects an amount of an optical device tremble;
   a correcting optical system that corrects a tremble of a focused image due to said optical device tremble; and
   a driving system that includes a stepping motor and a transmitting mechanism in which a driving amount of an object driven by said stepping motor is relatively small in comparison with a rotational amount of said stepping motor, and a deceleration of which is large, said transmitting mechanism being disposed between said stepping motor and said correcting optical system; and
   a controlling system that controls said driving system such that, when a difference between said trembling amount detected by said detector and a position data of said correcting optical system, calculated based on a one step driving amount of said driving system, reaches a predetermined threshold value, said driving device is driven to cancel said difference by controlling a flow of driving electric current in a coil of said stepping motor;
   wherein, when said difference is less than said predetermined threshold value, said coil is electrically de-energized by said controlling system; and
   a driving circuit that controls said driving electric current; and
   a switch that switches an electrical power supply to said driving circuit;
   wherein said controlling system controls said switch, so that said electrical power supply is one of started and stopped.

9. The correcting optical device of claim 8, wherein said deceleration is pre-set such that an external torque, generated by an external force applied to said optical device being transmitted to said stepping motor through said correcting optical system, is less than a detent torque of said stepping motor at rest.

10. The correcting optical device of claim 9, wherein said optical device is a pair of binoculars that includes a pair of telephoto optical systems.

11. The correcting optical device of claim 10, wherein said transmitting mechanism is a screw feeder mechanism.

* * * * *